(12) United States Patent
Frahm et al.

(10) Patent No.: US 8,623,559 B2
(45) Date of Patent: Jan. 7, 2014

(54) FUEL CELL SYSTEM WITH SUCTION OPERATION FOR AN AIRCRAFT

(75) Inventors: Lars Frahm, Hamburg (DE); Ulrich Rieger, Hamburg (DE); Claus Hoffjann, Hamburg (DE); Hansgeorg Schuldzig, Jork (DE)

(73) Assignee: Airbus Operations GmbH (DE)

( * ) Notice: Subject to any disclaimer, the term of this patent is extended or adjusted under 35 U.S.C. 154(b) by 875 days.

(21) Appl. No.: 12/680,023

(22) PCT Filed: Sep. 24, 2008

(86) PCT No.: PCT/EP2008/062773
§ 371 (c)(1),
(2), (4) Date: May 17, 2010

(87) PCT Pub. No.: WO2009/043775
PCT Pub. Date: Apr. 9, 2009

(65) Prior Publication Data
US 2010/0221642 A1    Sep. 2, 2010

Related U.S. Application Data

(60) Provisional application No. 60/995,553, filed on Sep. 27, 2007.

(30) Foreign Application Priority Data

Sep. 27, 2007   (DE) .................. 10 2007 046 381

(51) Int. Cl.
*H01M 8/06*   (2006.01)

(52) U.S. Cl.
USPC ..................... 429/408; 429/512; 429/428

(58) Field of Classification Search
USPC ......... 429/408, 410, 413, 414, 428, 450, 512, 429/513, 515; 210/416.1, 787
IPC .................................................. H01M 8/04,8/06
See application file for complete search history.

(56) References Cited

U.S. PATENT DOCUMENTS

| | | |
|---|---|---|
| 4,856,631 A | 8/1989 | Okamoto et al. |
| 4,865,631 A | 9/1989 | Stroby et al. |
| 4,955,091 A | 9/1990 | Grills et al. |
| 6,296,957 B1 | 10/2001 | Graage |
| 6,794,070 B2 | 9/2004 | Amrhein et al. |
| 2001/0021468 A1 | 9/2001 | Kanai et al. |
| 2002/0006537 A1 | 1/2002 | Kobayashi et al. |
| 2003/0003333 A1 | 1/2003 | Haridoss |
| 2004/0062960 A1 | 4/2004 | Sakaue et al. |
| 2006/0246339 A1 | 11/2006 | Norimatsu et al. |

(Continued)

FOREIGN PATENT DOCUMENTS

| | | |
|---|---|---|
| DE | 19821952 | 11/1999 |
| DE | 10157708 | 6/2003 |
| DE | 10205373 A1 | 8/2003 |
| DE | 102005053692 B3 | 1/2007 |

(Continued)

*Primary Examiner* — Basia Ridley
*Assistant Examiner* — Heng Chan
(74) *Attorney, Agent, or Firm* — Lerner, David, Littenberg, Krumholz & Mentlik, LLP (57) ABSTRACT

A fuel cell system for an aircraft is stated, which fuel cell system comprises a fuel cell unit and a suction module. The suction module is used to draw oxygen through the fuel cell unit. No vacuum generators are used during cruising flight.

16 Claims, 3 Drawing Sheets

(56) References Cited

U.S. PATENT DOCUMENTS

| | | |
|---|---|---|
| 2007/0111058 A1* | 5/2007 | Yoshida .................... 429/22 |
| 2007/0119863 A1* | 5/2007 | Hoffjann et al. ........... 222/129.1 |
| 2007/0145752 A1 | 6/2007 | Wobben |
| 2009/0214900 A1 | 8/2009 | Hoffjann et al. |
| 2010/0018723 A1 | 1/2010 | Bleil et al. |

FOREIGN PATENT DOCUMENTS

| | | | |
|---|---|---|---|
| DE | 102005053694 B3 | 1/2007 | |
| DE | 102005051583 A1 | 5/2007 | |
| WO | WO 2007048591 A2 * | 5/2007 | ............ H01M 8/02 |
| WO | WO 2007054314 A1 * | 5/2007 | |

* cited by examiner

FUEL CELL SYSTEM WITH SUCTION OPERATION FOR AN AIRCRAFT

CROSS-REFERENCE TO RELATED APPLICATIONS

This application is a national phase entry under 35 U.S.C. §371 of International Application No. PCT/EP2008/062773, filed Sep. 24, 2008, published in German, which claims the benefit of the filing date of US provisional patent application No. 60/995,553, filed on 27 Sep. 2007, and of German patent application No. 10 2007 046 381.4, filed on 27 Sep. 2007, the disclosures of which applications are hereby incorporated herein by reference.

FIELD OF THE INVENTION

The invention relates to the supply in aircraft. In particular, the invention relates to a fuel cell system for an aircraft, to a method for operating such a fuel cell system, to an aircraft comprising a fuel cell system, and to the use of a fuel cell system in an aircraft.

BACKGROUND TO THE INVENTION

As a rule, known fuel cell systems for operation in an atmosphere in which humans can breath are supplied with air, oxygen and hydrogen. In order to provide the air turnover necessary for complete conversion of the hydrogen, and thus to provide the necessary quantity of oxygen, fans or compressors are used on the air side. As a rule, these systems operate with excess air.

The compressors require energy, e.g. electrical energy, for operation; they emit noise and increase the overall weight of the system.

In addition, compressors comprise movable components that are subject to wear. This may reduce the overall reliability of such a system.

For the disposal of waste water from the passenger region, in today's commercial aircraft so-called vacuum waste-water systems are used. These systems transport sewage with the use of air as a transport medium, which air at cruising altitude flows from the on-board toilet to the waste water tank as a result of the pressure differential between the aircraft environment and the cabin pressure. In this arrangement the waste water tank is directly connected to the exterior air.

At low flight altitudes or on the ground the pressure differential required for the transport of sewage is generated by means of a vacuum generator. In this arrangement the waste water tanks used are, as a rule, constructed as pressure tanks that are designed for operation at a maximum possible pressure differential.

PRESENTATION OF THE INVENTION

It is an object of the present invention to state an improved fuel cell system for an aircraft.

According to an exemplary embodiment of the present invention, a fuel cell system for an aircraft is stated which comprises a supply module with a fuel cell unit and a suction module for drawing oxygen or an oxygen-containing gaseous mixture (e.g. air) through the fuel cell unit.

In this way the fuel cell unit which is, for example, designed as a fuel cell stack, and a vacuum system (suction module) that is used in the aircraft can be combined in order to provide the fuel cell system. Thus the function of a compressor may be replaced by the suction module (for example as a vacuum generator or in the form of an exterior-air connection). In this way the oxygen that is required in unison for reaction with hydrogen in the fuel cell can be drawn from the pressurised cabin region through the fuel cell unit.

Thus an additional compressor for the fuel cell system may be entirely done without. This results in savings of weight, the avoidance of additional wearing parts, and an increase in the overall reliability of the system.

According to an exemplary embodiment of the present invention, an energy management unit for controlling the suction performance of the suction module is provided so that the suction performance can be set independently of the flight altitude of the aircraft, wherein for drawing oxygen through the fuel cell unit the suction module comprises a waste water separator that is designed as a pressure tank and that for the purpose of generating the required negative pressure is connected to the aircraft environment, and which, furthermore, is designed to receive waste water from an on-board toilet or a wash basin.

According to a further exemplary embodiment of the present invention, the supply module is designed to produce fresh water and electrical energy. There is thus no need to provide voluminous fresh-water storage tanks that need to be exchanged or filled up prior to takeoff, because the required fresh water may be generated on board during the flight.

Because the supply module generates electrical energy by way of the fuel cell unit, it is also possible to do without additional power generators.

According to a further exemplary embodiment of the present invention, the supply module comprises a humidity/heat exchanger for pre-humidifying the oxygen drawn through the fuel cell unit.

In this arrangement the humidity/heat exchanger can be designed as an external component or as a device integrated in the fuel cell unit or in the fuel cell stack.

According to a further exemplary embodiment of the present invention, the suction module comprises a waste water separator for receiving waste water from an on-board toilet or wash basin, wherein the waste water separator is designed as a pressure tank.

For example, the waste water separator is connected to the aircraft environment by way of a corresponding valve so that at cruising altitude it can provide the negative pressure that is necessary to enable air or oxygen to be drawn through the fuel cell unit. In this case no generator, or no pump, is necessary to generate the suction effect.

If the external pressure is too high, an additional generator or an additional pump can be provided in order to achieve the suction effect.

According to a further exemplary embodiment of the present invention, the waste water separator is designed in the form of a cyclone separator. In this way separation of liquid from solid components is achieved by the airstream. The waste water enters, for example, the waste water separator, in other words the cyclone separator, tangentially. However, the waste water separator can also be present in any other design that makes such separation possible. For example, the waste water separator can be designed like a conventional aircraft waste-water tank. However, due to the separation of the function of transport and collection of the waste water, said waste water separator need only provide a volume of a few flushing processes (of the on-board toilet), which results in considerable weight savings.

According to a further exemplary embodiment of the present invention, the fuel cell system comprises a storage module for collecting the waste water from the waste water separator. The waste water separator is thus only used as an interim storage device.

According to a further exemplary embodiment of the present invention, the storage module comprises a wastewater storage tank that is always subject to the cabin pressure.

Thus the (large) waste-water storage tank may be made from materials that do not withstand considerable negative pressure. This can result in savings in weight and cost.

According to a further exemplary embodiment of the present invention, the suction module and the storage module form part of a vacuum system for an on-board toilet.

In this way a combination of a waste-water disposal system and a fuel cell system is provided in aircraft, wherein the waste-water disposal system is used for drawing air or other gases through the fuel cell unit.

According to a further exemplary embodiment of the present invention, the fuel cell system further comprises a fresh water module for storing the fresh water generated by the supply module.

For example, the fresh water module among other things comprises a cold-water circuit and a hot-water circuit with a heat exchanger. According to an exemplary embodiment of the present invention, the hot-water circuit can be heated by way of the heat exchanger by means of waste heat that arises during condensation in a condenser in the supply module or during operation of an electrical consumer. In each case the cold-water circuit and the hot-water circuit are designed to supply fresh water to passengers or consumers in the aircraft.

According to a further exemplary embodiment of the present invention, the cold-water circuit is designed with a regulating valve for feeding the hot-water circuit. In this way the quantity of water present in the hot-water circuit can be controlled and regulated. For example, for this purpose a control device is provided which, for example, is integrated in the energy management unit described below.

According to a further exemplary embodiment of the present invention, the fresh-water module comprises an ejector pump, for example a water jet pump, for approximating the pressure level of an output side to the pressure level of an input side of the condenser.

According to a further exemplary embodiment of the present invention, the fuel cell system comprises an energy management unit for controlling the suction performance of the suction module so that the suction performance can be set independently of the flight altitude of the aircraft.

Thus the energy management unit can, for example, control or regulate one or several valves that connect the waste water separator of the suction module to the exterior air. Furthermore, the energy management unit can be connected to a generator or to a pump which provides the suction performance should the exterior pressure be excessive.

According to a further exemplary embodiment of the present invention, the suction module is, furthermore, designed to supply oxygen-depleted air from the supply module to a space in the aircraft, which space is to be inerted.

In this arrangement the oxygen-depleted air is generated by the fuel cell unit (which after all consumes atmospheric oxygen). This air which is oxygen-depleted and nitrogen-enriched can then be used for inerting a space in the aircraft, or can be used for fire fighting or fire prevention. For example, this air can be fed to a fuel tank or can be used in a targeted manner for fire fighting. To this effect there may be further lines provided by way of which the oxygen-depleted air can be supplied in a targeted manner to the source of a fire.

According to a further exemplary embodiment of the present invention, the fuel cell system further comprises a pressure control device and an outlet to the exterior air of the aircraft, which are arranged in the space to be inerted. Furthermore, a line for connecting the suction module to the space to be inerted is provided, by way of which line the oxygen-depleted air can be supplied to the space.

According to a further exemplary embodiment of the present invention, the fuel cell system further comprises an oxygen sensor for measuring the oxygen content in the cathode exhaust gas of the fuel cell unit. In this way it is possible, for example, to detect whether the exhaust air delivered by the fuel cell unit can be used for fire fighting purposes or for inerting the space (in other words it is possible to detect whether the oxygen content is sufficiently low).

If need be the output of the fuel cell can be increased so that the oxygen content of the exhaust air decreases.

According to a further exemplary embodiment of the present invention, a method for operating a fuel cell system for an aircraft is stated, in which method oxygen is drawn through a fuel cell unit. This suction process is made possible by a suction module. Furthermore, fresh water and electrical energy are produced by a supply module, wherein the supply module comprises a fuel cell unit.

According to a further exemplary embodiment of the present invention, an aircraft with a fuel cell system as described above is stated.

According to a further exemplary embodiment of the present invention, the use of a fuel cell system described above in an aircraft is stated.

It should be noted that the exemplary embodiments of the invention that were described in relation to the fuel cell system also apply to the method, the use and the aircraft.

Further exemplary embodiments and advantages of the invention are stated in the following description of the figures.

Below, preferred exemplary embodiments of the present invention are described with reference to the figures.

In the following description of the figures the same reference characters are used for identical or similar elements. The illustrations in the figures are diagrammatic and not to scale.

Figure 1:
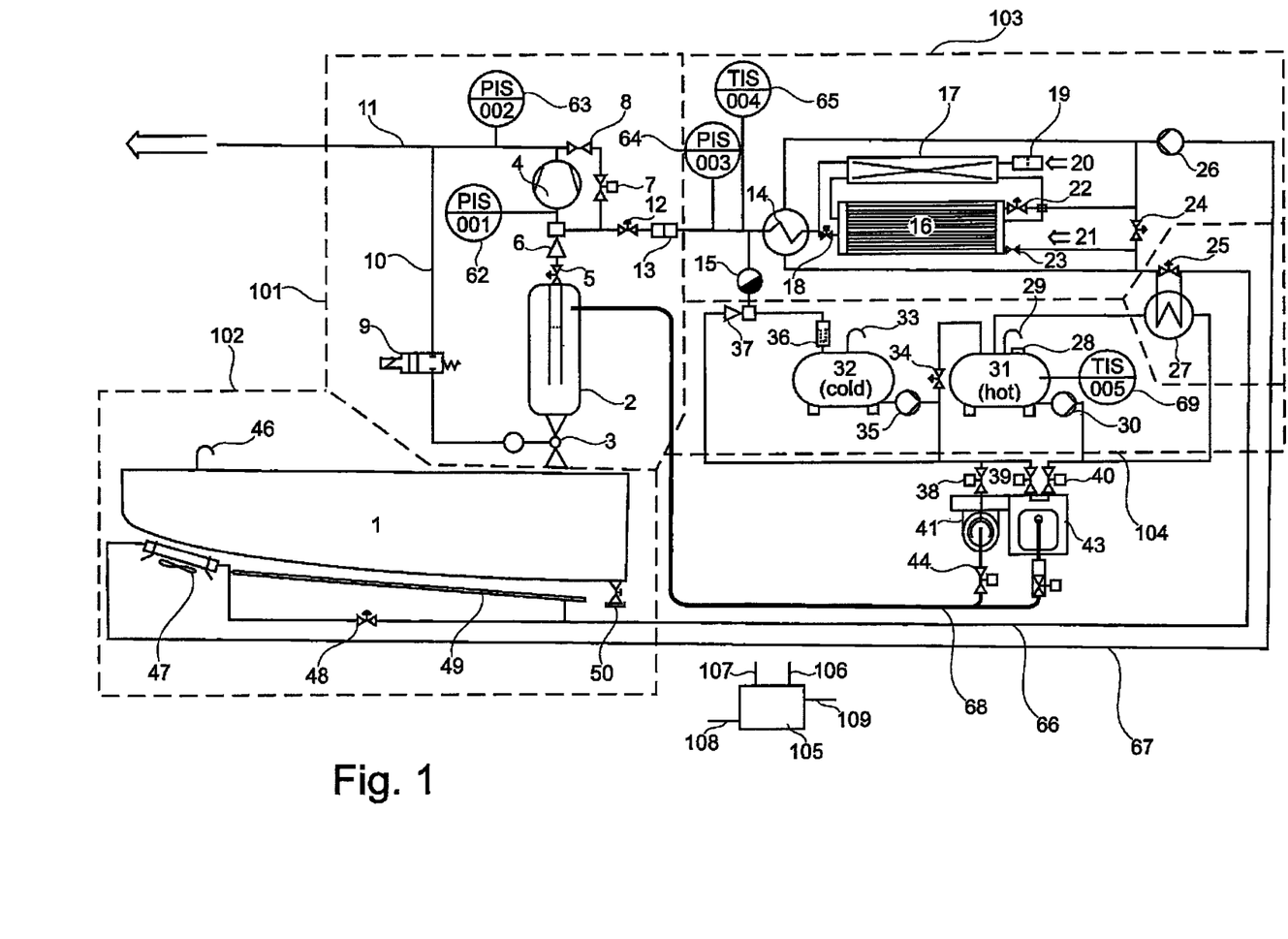
FIG. 1 shows a diagrammatic view of a fuel cell system according to an exemplary embodiment of the present invention.

FIG. 1 shows a diagrammatic two-dimensional view of a fuel cell system according to an exemplary embodiment of the present invention. The fuel cell system essentially comprises a suction module 101, a storage module 102, a supply module 103 and a fresh-water module 104.

The present invention combines the fuel cell unit or the fuel cell stack 16 with a vacuum system as, for example, used in aircraft. In the arrangement shown, the function of a compressor is replaced by the vacuum generator 4 or the exterior-air connection 11. In this way the oxygen required in the fuel cell for reaction with hydrogen is drawn, from the pressurised cabin region, by way of a humidity/heat exchanger for pre-humidifying, through the fuel cell 16. In this arrangement the humidity/heat exchanger can be either an external component or a unit integrated in the fuel cell stack 16.

This arrangement is associated with advantages in that there is no need to provide an additional compressor for the fuel cell system, there are resulting savings in weight, additional wearing parts are avoided, and the overall reliability is improved.

A further advantage arises from the system's operating modes which as a rule occur. The size and design of the fuel cell system can be selected so that the quantity of water to be delivered directly matches the requirements of the cabin systems. The energy generated in this way can then fully meet the requirements arising during cruising. The reduced requirement of water and electrical energy during ascent, descent and on the ground is automatically compensated for by the fuel cell system so that the pressure gradient between the cabin and the exterior air, which pressure gradient decreases at lower flight altitudes, results in a reduced conversion rate in the fuel cell 16 so that the delivered output automatically decreases.

For cases where the energy management system 105 of the aircraft nevertheless requires electrical power there is the option of increasing the airstream by way of the vacuum generator 4 and in this way to increase the system output independently of the flight altitude.

A further aspect of the invention relates to the water output from the fuel cell unit 16, which operates at negative pressure when compared to the cabin pressure. Since at the pressure conditions described a water output by means of a condensate trap of a conventional design does not always work, the pressure levels of the output side and of the drain side of the condensate trap match each other.

To this effect an ejector pump (for example a water jet pump) 6 that is integrated in a water circuit is used, which ejector pump on its suction side provides pressure that is identical to the system pressure of the fuel cell unit 16 on the condensate trap so that the latter can open when water arises. Control of the pressure level of the water circuit takes place by way of the circulation pump 30 of said water circuit.

In addition, the arrangement comprises two water circuits, namely a cold-water circuit and a hot-water circuit. In this arrangement the hot-water circuit is heated with the waste heat arising during condensation. This condensation is the water condensed out of the fuel cell exhaust gas. Consequently the water heaters that are presently in common use in washrooms and galleys can be saved entirely, which provides an additional advantage in relation to savings of weight and maintenance expenditure.

On the other hand, the hot-water circuit in the buffer tank 31 comprises a preferably electrical booster heater or a heat exchanger so that the coolant of the fuel cell 16 can be preheated by way of a heat exchanger between the hot-water circuit and the coolant circuit in order to either bring the fuel cell to operating temperature more quickly, or to prevent freezing of the fuel cell in frosty conditions.

Instead of, or in addition to, an electrical heating element, at this location it is also possible to use a heat exchanger that uses the waste heat of some other system, for example the waste heat from electrical appliances.

In vacuum waste-water systems the term "vacuum" in the conventional sense refers to the differential pressure between the environment of the on-board toilet and the waste water tank (vacuum tank or separator 2) or a comparable arrangement. In the present case the vacuum tank is replaced by a so-called suction module 101 whose function corresponds to that of a waste-water transport tank. Such a transport tank is described below with reference to FIG. 3.

The suction module 101 is a centerpiece of the invention; it comprises a combination of a so-called cyclone waste-water separator 2, a vacuum generator 4, an ejector pump 6, a pneumatic relief valve 3, a bypass with valve 7 and flap valve 8, a regulating valve for vacuum transport 5, a regulating valve for the airstream through the fuel cell 12, a vacuum control line 10 comprising a control valve 9, three pressure sensors (PIS001, PIS002, PIS003) 62, 63, 64, a temperature sensor (TIS004) 65 and a germ filter 13.

Furthermore, an outboard vent connection 11 is provided, which connects the suction module 101 to the exterior air.

In this design the regulating valve 5 is arranged between the ejector pup 6 and the separator 2. Downstream of the ejector pump 6 the line branches off. The first part leads to the vacuum generator 4 and by way of the pressure sensor 63 and the outboard vent connection 11 to the exterior region of the aircraft. The second line branch leads by way of the regulating valve 12 and the germ valve 13 to the supply module 103. On this path the pressure sensor 64 and the temperature sensor 65 are provided. The first pressure sensor 51 is affixed in the first line branch (for example directly upstream of the vacuum generator 4). The two line branches are interconnected (downstream of the vacuum generator 4) by way of a nonreturn valve 8 and a bypass valve 7.

Furthermore, there is a connection between the outboard vent connection 11 and the waste water valve 3 (which is arranged between the separator 2 and the waste-water collection tank 1) in the form of a control valve 9 and a control line 10.

All the valves, pumps, control systems and regulating systems mentioned below can be controlled and regulated by way of one central control unit or several individual control units and regulating units.

For example, the diagrammatically shown energy management unit 105, which can be connected to the four modules 101, 102, 103 and 104 and their corresponding control system, valves, pumps, generators, sensors and the like, is such a central control unit. The indicated lines 106, 107, 108 and 109 are provided for this purpose. Communication can also take place wirelessly.

The suction module 101 is connected to a storage module 102 by way of the relief valve 3. The storage module 102 comprises a waste-water storage tank or waste-water collection tank 1, a ventilation device 46, a drainage device 50, and a heating/cooling combination with a bypass 47, 48, 49.

The waste-water drainage valve 50 is, for example, located on the underside of the collection tank 1. The heating/cooling combination with bypass comprises an exterior-air radiator 47, a coolant bypass valve 48, as well as an antifreeze storage tank 49. The coolant bypass valve 48 is used to bypass the storage tank 49. The line 66 leads from the storage tank 49 or from the bypass valve 48 to the heat exchanger 27 or to the bypass control of the hot-water heat exchanger 25.

The exterior-air radiator 47 is connected between the antifreeze storage tank 49 and, by way of the line 67, the coolant pump 26.

The ventilation device 46 is, for example, arranged on the waste-water collection tank 1.

The suction module 101 and the storage module 102, together with the on-board toilet 41 and the wash basin 43 as well as the associated valves 38 (fresh-water flushing valve), cold-water valve 39 and hot-water valve 40 form the vacuum system. In this arrangement any number of wash basins and toilets can be used.

The on-board toilet 41 (toilet pan) is connected to the separator 2 by way of the vacuum flushing valve 44 and the line 68. Likewise, the wash basin 43 is connected to the separator 2 by way of the vacuum transfer unit 45 (with a corresponding valve) by way of the line 68.

The third module is the supply module 103 for producing fresh water and electrical energy. This supply module 103 comprises a fuel cell stack 16, a humidity/heat exchanger 17, a purge valve 18 on the anode side, a germ filter 19 on the incoming air side, a cabin air feed line 20, a hydrogen inlet 21, a coolant circuit with a coolant pump 26, a shut-off valve 23, a regulating valve 22, 24, a condenser 14 with a condensate trap 15, and a heat exchanger 27 with a regulating valve 25.

On one side the fuel cell stack 16 is connected to the hydrogen inlet 21, which is, for example, connected to a hydrogen collection tank or some other hydrogen storage device. Furthermore, the fuel cell stack 16 is connected to the condenser 14 and the coolant pump 26 by way of the regulating valve of the cooling system 22, and to the hot-water heat exchanger 27 or back to the condenser 14 by way of the additional bypass control of the cooling system 24. Coolant shut-off can take place by way of the valve 23. The hydrogen purge-gas relief valve 18 connects the other side of the fuel cell stack 16 to the condenser 14 and to the humidity/heat exchanger 17. Furthermore, by way of the condensate trap 15 a connection between the condenser 14 and the cold-water tank 32 is provided.

By way of the particle- and germ filter 19, cabin air 20 or some other oxygen-containing gas mixture is fed to the humidity/heat exchanger 17 where the air is humidified before being fed to the fuel cell 16.

The fourth module is the fresh-water module 104. The fresh-water module 104 comprises two water circuits, namely a cold-water circuit and a hot-water circuit.

The cold-water circuit comprises the ejector pump 37, the salination- and pH buffer unit 36, the non-pressurised buffer container 32 with the ventilation device 33, and the circulation pump 35.

From the cold-water circuit the hot-water circuit is fed by way of the regulating valve 34. The hot-water circuit comprises the non-pressurised buffer container 31 with the ventilation device 29 and the electrical booster heating rod 28 as well as the temperature sensor 69 (TIS005), the heat exchanger 27, which also forms part of the supply module, and the circulation pump 30.

In this arrangement the cold-water buffer tank 32 comprises a ventilation device 33 at the top. Furthermore, the cold-water buffer tank 32 is connected to the condenser 14 by way of the germ filter 36 and the condensate trap 15. The ejector pump 37 is provided to feed the circuit. Pressurisation is by way of the (circulation) pump 35.

The cold-water buffer tank 32 is connected to the hot-water buffer tank 31 by way of the circulation pump of the cold-water circuit 35 and a filling valve of the hot-water circuit 34. Likewise the cold-water buffer tank 32 is connected to the ejector pump 37 by way of the circulation pump 35 so that the cold-water circuit is closed.

The hot-water buffer tank 31 also comprises a ventilation device 29 at the top, as well as an electrical booster heater 28. Furthermore, the hot-water buffer tank 31 is connected to the hot-water heat exchanger 27.

The tap points are directly connected to the water circuits; they form part of the respective wash basins or toilet modules 41, 43.

On the wash basins 43 these are usually the taps (mixing valves) each comprising a valve for cold water 39 and a valve for hot water 40, as well as at the outflow a so-called waste-water transfer unit 45, which releases the waste water to the vacuum system.

On the on-board toilets 41 these are, as a rule, a flushing valve 38 for flushing water into the vacuum system 44 in order to dispose of the waste from the toilet pan into the vacuum system.

The overall system is supplemented by an electronic control unit 105 that controls the system functions (also referred to as the energy management unit).

In addition, infeed of the electrical energy from the fuel cell stack 16 to the on-board network of the aircraft takes place, for example, by way of a corresponding controller unit, which matches the voltage and if applicable the frequency to the on-board network of the aircraft.

It is also possible for this controller unit to be integrated in the energy management unit 105.

Figure 2:
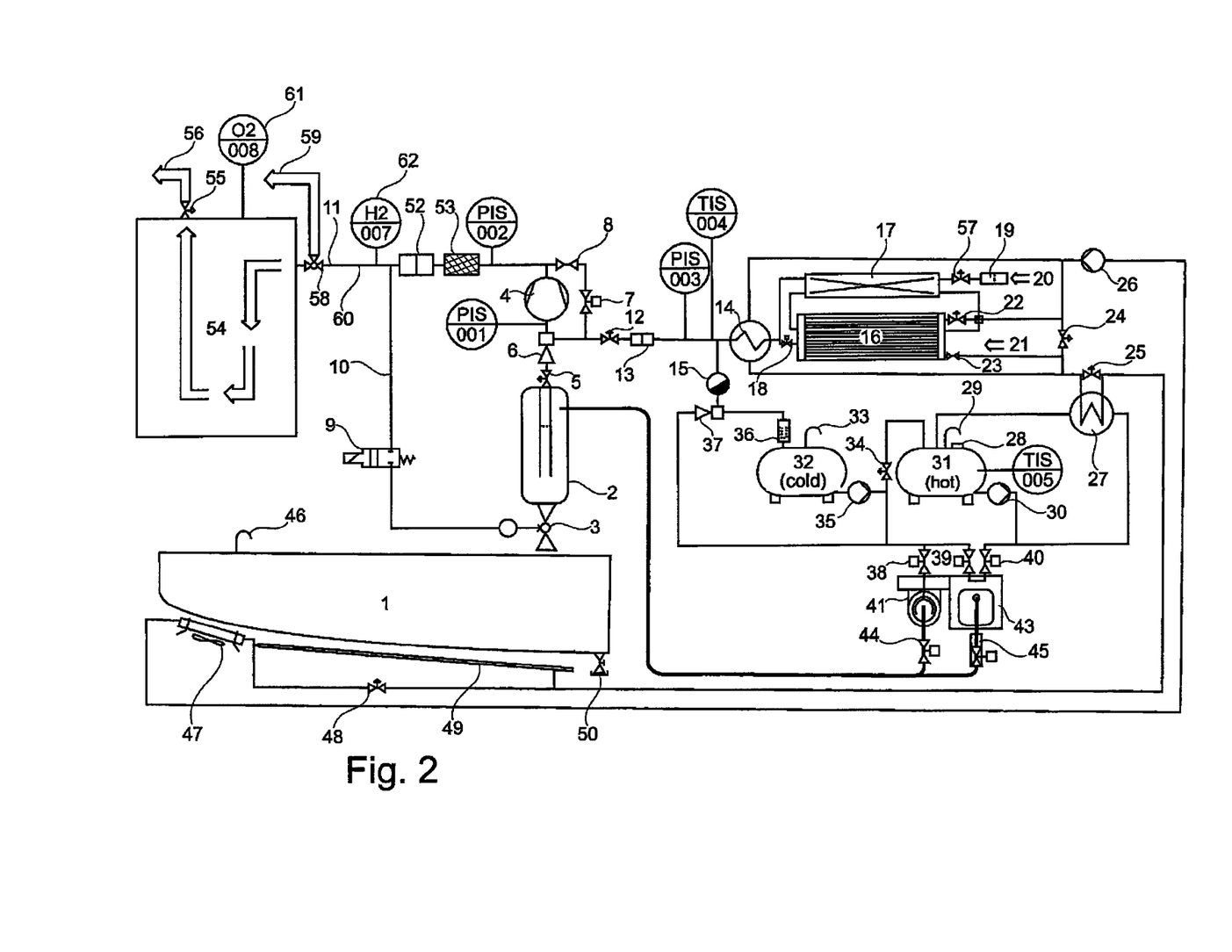
FIG. 2 shows a diagrammatic view of a fuel cell system according to a further exemplary embodiment of the present invention.

FIG. 2 shows a diagrammatic view of a fuel cell system according to a further exemplary embodiment of the present invention.

In addition to the system shown in FIG. 1, a further germ- and odour filter 52, a catalytic converter 53 for converting the residual hydrogen, a pressure control valve exit 55, an outlet 56, a pressure-control valve entry 57, a three-way valve 58, a bypass and an oxygen sensor are provided. In this way a space 54 can be inerted, or a fire can be extinguished.

Among other things for preventative fire protection, for fire fighting and for sedation of persons or to increase performance in the field of sports, systems are known that reduce the oxygen partial pressure within a closed space or air volume in such a way that the above-mentioned effects can be achieved. From DE 102 05 373 A1 a fire fighting system with a fuel cell is known wherein oxygen is converted in a closed system in a fuel cell until no oxygen is present any longer. From DE 10 2005 053 692 B3 a fire fighting system is known which uses cathode exhaust air of fuel cells.

For inerting (oxygen reduction) the air in a space, the space is subjected to the cathode exhaust air of a fuel cell system, preferably of a low-temperature fuel cell system.

In the exemplary embodiment, shown in FIG. 2, of the present invention the air is drawn through the fuel cell stack. The air excess on the cathode side determines the residual oxygen content in the cathode exhaust gas. This value can be adjusted by way of a regulating valve 57 at the cathode entry. The residual oxygen content in the exhaust gas is measured by way of an oxygen sensor 60 and is correspondingly set by way of the regulating valve 57. This is important because otherwise the reading concerning the oxygen in the space does not tally with that in the exhaust gas. Therefore this regulation is decisive for regulating the so-called lambda value.

Leading the oxygen-reduced air through the space 54 to be inerted takes place either by way of a pressure gradient between the space air at the exit and the cathode entry on the fuel cell side, or by way of a pressure gradient between a vacuum generator that forms part of another system and the cathode entry on the fuel cell side. The pressure side of the vacuum generator pressurises the space 54 to be inerted, and this air is then fed to the exterior with excess pressure.

Advantageously, this arrangement is used in aircraft, where, for example, tanks, cargo holds or electronics compartments can be inerted with the cathode exhaust air. The above-mentioned vacuum generator can be supplemented or replaced by the aircraft vacuum waste-water system.

The arrangement shown combines system elements of the two individual systems of fuel cell unit (fuel cell stack) and vacuum waste-water system. The arrangement makes it possible to inert spaces by way of such a system, as well as to operate this system by way of suction forces or pressure forces.

Due to the pressure gradient between the exhaust air of the space to be inerted and the incoming air to the fuel cell, oxygen-containing air is drawn through the fuel cell. The fuel-cell exhaust air then flows into the space to be inerted.

These boundary conditions are present, for example, in aircraft travelling at cruising altitude if the incoming-air side is arranged within the pressure cabin, and the exhaust air side is directed to the aircraft environment.

In the case of an insufficient pressure gradient, e.g. on the ground or at low flight altitudes, an interposed vacuum generator 4 is used so that the suction side is directed onto the cathode exhaust air of the fuel cell system while the pressure side is directed towards the space to be inerted.

The use of the vacuum generator 4, for example a vacuum waste-water system, requires particular measures in order to prevent odour nuisance or health risks arising from germs from the waste water system. To this effect an odour- and germ filter is installed between the vacuum generator and the space to be inerted.

This germ- and odour filter is designated by reference character 52.

By means of the three-way valve 58 and the bypass 59 it is possible to bypass the space to be inerted. If the pressure in the space 54 to be inerted is excessive, the pressure control valve 55 opens the outlet 56 so that air can be let out from the space. The oxygen content of the space can be measured by way of the oxygen sensor 61.

The space 54 to be inerted comprises an outlet 56 with a pressure control device 55 in order to ensure the internal pressure of the space and to ensure that air flows through the fuel cell. In operation of the aircraft this pressure control can be implemented by the so-called outflow valve, a device which is, for example, used for controlling the pressure in an aircraft cabin. Overall, the system between the control at the cathode entry of the fuel cell and the outflow valve is to be controlled so that a constant pressure level is achieved in the space to be inerted.

Owing to the principle involved, in an aircraft travelling at cruising altitude the value of this pressure level is between that of the cabin pressure and the exterior air pressure, while on the ground and at low flight altitudes, i.e. with vacuum generator operation, the value of the pressure level is above that of the cabin level and the exterior air pressure.

Depending on the use of the space 54 to be inerted, e.g. as a storage volume for fuel or as an electronics compartment, it is advantageous to dry the cathode exhaust air. In an application in an aircraft, the water fraction obtained by drying the cathode exhaust air can be provided for use in the on-board drinking water system.

The requirement for low-oxygen air for a particular space volume is constant. The present arrangement thus requires a fuel cell system that is tied into the on-board network with a relatively constant base load. The constant base load also corresponds to a constant oxygen conversion. As described, the excess air on the cathode side corresponds to the residual oxygen content in the exhaust gas of the fuel cell unit at constant oxygen conversion. In this way a corresponding design makes it possible to achieve very economical operation of the system.

The suction-/pressure module 101 is connected to the space 54 to be inerted, wherein the space comprises a pressure control device 55 and an outlet 56 for exterior air, an O2 sensor 61 (02 006), a bypass 59 by way of a distributing valve 58, as well as a hydrogen sensor 62 (H2 007).

In the cathode exhaust air there is also an oxygen sensor 60 by way of which sensor regulation of the oxygen content can be measured.

Figure 3:
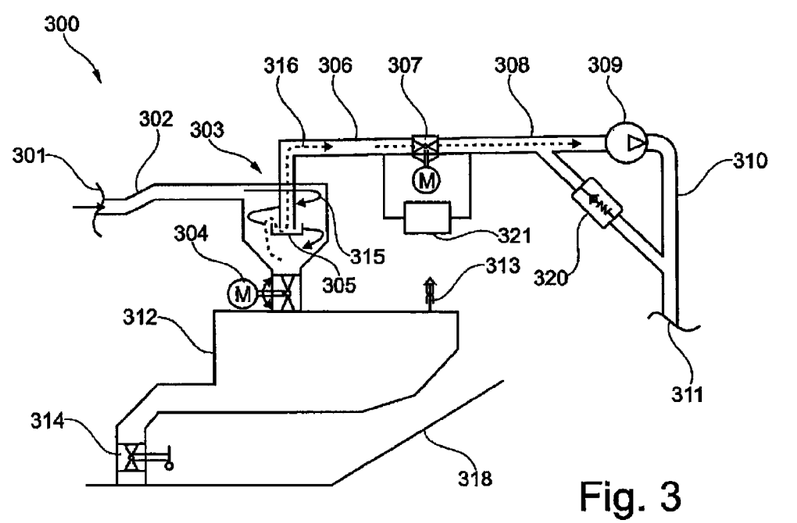
FIG. 3 shows a diagrammatic view of a vacuum toilet system that forms part of the fuel cell system according to an exemplary embodiment of the present invention.

FIG. 3 shows a diagrammatic two-dimensional section view of the vacuum toilet system 300 according to the invention according to an exemplary embodiment of the present invention. The flushing valve of the toilet 301 provides the connection between the toilet-/cabin region and the region with the remaining system. This remaining region can be located behind or beneath the cabin region. In hitherto known solutions of vacuum toilet systems this flushing valve 301 was associated with a so-called vacuum bang, which can be eliminated by the present invention. This is due to the large pressure differential that is present directly at the flushing valve. Sine the present invention can optionally also be used in the operation of a conventional vacuum toilet system, the flushing valve is designed so that it withstands the corresponding pressure differential. From this flushing valve a first line 302 leads to the waste-water transport tank 303. This line is designed so as to be pressure resistant, wherein the term "pressure resistant" denotes that said line withstands the expected pressure differential that is necessary for removal of the waste water. A second line 306 is stated which leads from the waste-water transport tank 303 to the outboard venting device 307. Likewise, the outboard venting device 307 is connected to the vacuum generator 309 by way of a further line 308. Furthermore, a line 310 connects said vacuum generator 309 to the exterior skin 311 of the aircraft. All the above-mentioned lines are designed so as to be pressure resistant. Likewise, the waste-water transport tank 303 is designed in such a shape and comprising such a material that it withstands the pressure differential. In this arrangement the waste-water transport tank can be designed in the form of a cyclone separator in order to ensure separation of the airstream that emanates from the toilet into fluid and solid components within the waste-water transport tank. The airstream can then continue by way of the lines 306, 308 and 310 and can escape to the outside. As a result of the tangential entry of the waste water into the waste-water transport tank in the case of a cyclone separator, separation of the waste water from the airstream is ensured. This provides a further advantage in that it is no longer necessary to install an impact protection device to prevent hard-impacting objects such as batteries from passing through the system. This provides a weight advantage when compared to the conventional solutions of waste-water storage tanks in vacuum toilet systems.

Due to the separation of the two functions of "transporting the waste water" and "collecting the waste water" the volume of the waste-water transport tank can be limited to a minimum. This minimum volume can, for example, comprise the expected volume of two flushing processes. This is a further weight advantage of the present invention when compared to conventional solutions. However, the waste-water transport tank can also be designed like a conventional aircraft waste-water tank. In this arrangement, a separation device 305 needs to be provided in order to prevent the liquid and solid components of the waste water from entering the line 306. In the present embodiment, by way of an example, the waste-water tank separator-valve 304 is arranged underneath the waste-water transport tank 303. In this arrangement this valve is also designed so as to be pressure resistant because during transport of the waste water in the waste-water collection tank it is subject to the effective pressure differential. In this way a situation can be avoided in which forces that result from the pressure differential only act on the waste-water collection tank 312. In this arrangement the waste-water separator valve controls the transport of the waste water from the waste-water transport tank 303 to the waste-water collection tank 312. Since at the point in time of transport of the waste water from the waste-water transport tank to the waste-water collection tank both tanks are subject to cabin pressure, this exchange takes place entirely without any pressure. For example, the exchange is to be ensured solely by means of gravitational force. In contrast to this, the waste-water collection tank can be designed as a conforming non-pressurised collection tank for waste water because it is always under cabin pressure. This makes it possible for the waste-water collection tank to adapt its shape to its surroundings, for example to the aircraft fuselage. This in turn results in optimum use of available space and in optimum integrability of the waste-water collection tank.

Since at no point in time does a pressure differential act on the waste-water collection tank, it is possible to produce it in a lightweight construction design. However, this does not exclude the option of using it in conventional materials design and shape. However, especially in times where there are great efforts to design large-volume aircraft so that they are lighter in weight, possible lightweight designs assume particular significance. A drainage valve 314 is installed at the lower end of the waste-water collection tank 312. The term "drainage valve" refers to any closing device that is designed so that emptying the waste-water collection tank is, for example, made possible when the aircraft is on the ground. Because the waste-water collection tank 312 is vented relative to the cabin, the former comprises an odour seal 313 in order to prevent odour nuisance in the cabin region.

A flushing procedure that is made possible by this exemplary embodiment of the present invention, in which both the so-called vacuum bang can be avoided and a conformant non-pressurised waste-water collection tank can be used, with the described elements operates as follows: in the idle state of the vacuum toilet system the flushing valve of the toilet, the outboard venting device and the waste-water tank separator-valve are closed. The lines and the waste-water transport tank are subject to cabin pressure. The lines from the outboard venting device 307 onwards, in other words lines 308 and 310, are subject to exterior pressure. If a flush request occurs in the toilet, a monitoring device 321 checks whether there is adequate cabin pressure differential. The term "cabin pressure differential" refers to the pressure differential between the cabin pressure and the exterior pressure. If a minimum pressure differential is not reached, the vacuum generator 309 is switched on. Said vacuum generator 309 generates negative pressure in the lines upstream of the outboard venting device 307, in other words in the region of the line 308. Next the flushing valve of the toilet 301 opens. Cabin pressure continues to be present in the lines to the outboard venting device and to the waste-water transport tank. Next the outboard venting device 307 is opened. The pressure differential between the cabin and the surroundings causes an airstream from the toilet by way of the lines through the waste-water transport tank to the outside. This airstream causes the waste water to be transported to the waste-water transport tank. Because the waste-water transport tank 303 is designed in the form of a cyclone separator, and the waste water enters this cyclone separator tangentially, solid and liquid components are separated by the airstream and remain in the waste-water transport tank. However, some other design of this waste-water transport tank is also imaginable. For example, the transport tank could be designed in the manner of conventional aircraft waste-water tanks. Since the waste-water transport tank only needs to hold the volume of a maximum of two flushing procedures its volume can be greatly reduced when compared to conventional solutions. After a period of time that is sufficient for the waste water to be transported to the waste-water transport tank, the outboard venting device is closed. Consequently, the system from the toilet to the outboard venting device is again subject to cabin air because the flushing valve of the toilet is still open. In order to prevent any odour nuisance in the cabin region the toilet flushing valve 301 is closed again. Next the waste water is transported from the waste-water transport tank 303 to the waste-water collection tank 312 by means of the waste-water tank separator-valve 304 that then opens. Since at this stage both tanks 303 and 312 are subject to cabin pressure, it is ensured that this transport works without any pressure differential. For example, the waste water reaches the waste-water collection tank under the influence of gravity. This waste-water collection tank is at all times vented vis-à-vis the cabin and comprises an odour seal 313. When all the waste water has reached the collection tank, the waste-water tank separator-valve closes, and the system assumes its idle state. Finally, it should be mentioned that the pressure differential between the flushing valve of the toilet and the outboard venting device is responsible for transporting the waste water, wherein this pressure differential corresponds exactly to the pressure differential between the cabin pressure and the exterior pressure. This pressure differential can, however, also be set to a lower value by means of the valve 58 or 55. Moreover, it should be mentioned that the system can be designed so that, in the case of a flushing request, first the outboard venting device opens and thus the entire train of pipes is subject to ambient pressure. In the next step the flushing valve of the toilet can be opened. Thereafter this alternative flushing mode as described above takes place. This variance in the flushing mode can, for example, be used if it were determined that the so-called vacuum bang is advantageous for removing the waste water. Due to the option of selecting between the two flushing sequences, depending on the flight phase of the aircraft, one or the other flushing mode can be selected. For example, during a night flight the flushing mode that avoids the vacuum bang can be selected. It should also be mentioned that the exemplary embodiment of the present invention in FIG. 3 shows only one waste-water transport tank 303. It is, however, also possible to connect several independent subsystems with their own toilet pipes and waste-water transport tanks to a waste-water collection tank 312. This provides the advantage of decoupling the disposal procedures while at the same time using a storage tank. Likewise, different usage of subsystems can be counteracted, where in certain circumstances premature switching off of the system as a result of a full waste-water collection tank can occur. FIG. 3 shows the waste water 315 entering the waste-water transport tank 303, and the airstream 316 exiting through the lines 306 and 308. Furthermore, a vent pipe nonreturn-valve 320 can be installed.

Figure 4:
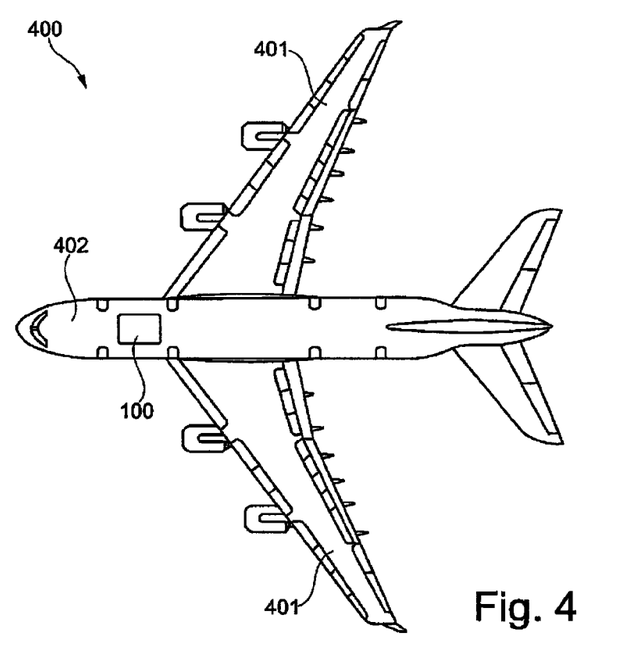
FIG. 4 shows a diagrammatic view of an aircraft according to an exemplary embodiment of the present invention.

FIG. 4 shows a diagrammatic two-dimensional view of an aircraft according to a further exemplary embodiment of the present invention. The aircraft 400 comprises a fuselage 402 and wings 401. Likewise, the aircraft 400 comprises a fuel cell system 100 according to the present invention, wherein the fuel cell system is, for example, arranged in the front fuselage region. Placement of the system at other positions in the aircraft is also possible. Moreover, the system can be split up into several separate units which are arranged at various positions in the aircraft.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

LIST OF REFERENCE CHARACTERS

1 Waste-water collection tank
2 Separator
3 Waste-water valve
4 Vacuum generator
5 Regulating valve
6 Ejector pump 7 Bypass valve
8 Nonreturn valve
9 Control valve
10 Control line
11 Outboard vent connection
12 Regulating valve
13 Germ filter
14 Condenser
15 Condensate trap
16 Fuel cell stack
17 Humidity/heat exchanger
18 Hydrogen purge-gas relief valve
19 Particle- and germ filter for air inlet
20 Cabin air
21 Hydrogen inlet
22 Regulating valve cooling
23 Coolant barrier
24 Bypass control cooling
25 Bypass control hot-water heat exchanger
26 Coolant pump
27 Hot-water heat exchanger
28 Electrical booster heater
29 Ventilation
30 Circulation pump hot-water circuit
31 Hot-water buffer tank
32 Cold-water buffer tank
33 Ventilation
34 Filling valve hot-water circuit
35 Circulation pump cold-water circuit
36 Germ filter
37 Ejector pump
38 Fresh-water flushing valve
39 Cold-water valve
40 Hot-water valve
41 Toilet pan 43 Wash basin
44 Vacuum flushing valve
45 Vacuum water-transfer unit
46 Ventilation
47 Exterior-air radiator
48 Coolant bypass valve
49 Antifreeze storage tank
50 Waste-water drainage valve
51 —
52 Germ and odour filter
53 Catalytic converter
54 Inerted space
55 Pressure control valve, exit
56 Outlet
57 Pressure control valve, entry
58 Three-way valve
59 Bypass
60 Oxygen sensor

The invention claimed is:

1. A fuel cell system for an aircraft, the fuel cell system comprising:
a supply module with a fuel cell unit;
a suction module for drawing oxygen through the fuel cell unit; and
an energy management unit for controlling a suction performance of the suction module so that the suction performance is configured to be set independently of a flight altitude of the aircraft;
wherein the suction module comprises a waste water separator and is configured to draw oxygen through the fuel cell unit and to receive and separate waste water from an on-board toilet or wash basin; and
wherein the waste water separator is further configured as a pressure tank and is connected to an aircraft environment for generating a required negative pressure.

2. The fuel cell system of claim 1,
wherein the supply module is configured to produce fresh water and electrical energy.

3. The fuel cell system of claim 1,
wherein the supply module comprises a humidity/heat exchanger for pre-humidifying the oxygen drawn through the fuel cell unit.

4. The fuel cell system of claim 1,
wherein the waste water separator is configured in the form of a cyclone separator.

5. The fuel cell system of claim 1, further comprising:
a storage module for collecting the waste water from the waste water separator.

6. The fuel cell system of claim 5,
wherein the storage module comprises a waste-water storage tank that is always subjected to cabin pressure.

7. The fuel cell system of claim 5,
wherein the suction module and the storage module form part of a vacuum system for an on-board toilet.

8. The fuel cell system of claim 1, further comprising:
a fresh-water module for storing the fresh water generated by the supply module.

9. The fuel cell system of claim 8,
wherein the fresh-water module comprises a cold-water circuit and a hot-water circuit with a heat exchanger;
wherein the hot-water circuit is configured to be heated by a heat exchanger by waste heat arising during condensation in a condenser in the supply module or during operation of an electrical consumer; and
wherein the cold-water circuit and the hot-water circuit are configured to supply fresh water in the aircraft.

10. The fuel cell system of claim 9,
wherein the cold-water circuit comprises a regulating valve for feeding the hot-water circuit.

11. The fuel cell system of claim 9,
wherein the fresh-water module comprises an ejector pump for approximating a pressure level of an output side to a pressure level of an input side of the condenser.

12. The fuel cell system of claim 1,
wherein the suction module is configured to supply oxygen-depleted air from the supply module to a space in the aircraft, which space is to be inerted.

13. The fuel cell system of claim 12, further comprising:
a pressure control device;
an outlet to an exterior air of the aircraft; and
a line for connecting the suction module to the space to be inerted;
wherein the pressure control device and the outlet are arranged in the space.

14. The fuel cell system of claim 1, further comprising:
an oxygen sensor for measuring oxygen content in a cathode exhaust gas of the fuel cell unit.

15. A method for operating a fuel cell system for an aircraft, the method comprising:
drawing oxygen through a fuel cell unit by means of a suction module;
producing fresh water and electrical energy by means of a supply module which comprises the fuel cell unit; and
controlling a suction performance of the suction module so that the suction performance is configured to be set independently of a flight altitude of the aircraft;

wherein the suction module comprises a waste water separator and is configured to draw oxygen through the fuel cell unit and to receive and separate waste water from an on-board toilet or wash basin;

wherein the waste water separator is configured as a pressure tank and is connected to an aircraft environment for generating a required negative pressure.

16. An aircraft comprising a fuel cell system; the fuel cell system comprising:

a supply module with a fuel cell unit;

a suction module for drawing oxygen through the fuel cell unit; and an energy management unit for controlling a suction performance of the suction module so that the suction performance is configured to be set independently of a flight altitude of the aircraft;

wherein the suction module comprises a waste water separator and is configured to draw oxygen through the fuel cell unit and to receive and separate waste water from an on-board toilet or wash basin; and wherein the waste water separator is configured as a pressure tank and is connected to an aircraft environment for generating a required negative pressure.

* * * * *